United States Patent [19]

Duhamel et al.

[11] Patent Number: 4,788,654

[45] Date of Patent: Nov. 29, 1988

[54] DEVICE FOR REAL TIME PROCESSING OF DIGITAL SIGNALS BY CONVOLUTION

[76] Inventors: Pierre Duhamel, 97, avenue de Verdun 92130; Hendrik Hollmann, 21, rue d'Estienne d'Orves 92130, both of Issy Les Moulineaux, France

[21] Appl. No.: 778,963

[22] Filed: Sep. 23, 1985

[30] Foreign Application Priority Data

Sep. 24, 1984 [FR] France .................................. 84 14624

[51] Int. Cl.$^4$ ...................... G06F 15/31; G06F 15/332
[52] U.S. Cl. ................................. 364/728.01; 364/725
[58] Field of Search ................................ 364/725, 728

[56] References Cited

U.S. PATENT DOCUMENTS

| | | | |
|---|---|---|---|
| 4,048,485 | 9/1977 | Nussbaumer | 364/728 |
| 4,181,968 | 1/1980 | Johnson | 364/728 |
| 4,216,475 | 8/1980 | Johnson | 364/725 |

OTHER PUBLICATIONS

Rader, "Discrete Convolutions via Mersenne Transforms" *IEEE Trans. on Computers*, vol. C-21, #12, pp. 1269-1273, Dec. 1972.
Agarwal et al., "Fast Convolution Using Fermat Number Transforms with Applications to Digital Filtering", *IEEE Trans. on Acoustics, Speech and Signal Processing*, vol. ASSP-22, #2, pp. 87-97, Apr. 1974.
Nussbaumer, "Digital Filtering Using Pseudo Fermat Transforms", *IBM Technical Disclosure Bulletin*, vol. 19, #2, pp. 530-533, Jul. 1976.
Nussbaumer, "Pseudo Mersenne Transform Devices", *IBM Technical Disclosure Bulletin*, vol. 20, #2, pp. 632-633, Jul. 1977.
Agarwal et al., "New Algorithms for Digital Convolution", *IEEE Trans. on Acoustics, Speech, and Signal Processing*, vol. ASSP-25, #5, pp. 392-410, Oct. 1977.
Reed et al., "A Fast Computation of Complex Convolution Using a Hybrid Transform", *IEEE Trans. on Acoustics, Speech and Signal Processing*, vol. ASSP-26, #8, pp. 566-570, Dec. 1978.
Koyano et al., "A Digital Convolver Using a Number Theoretic Transform", *The Trans. of the IECE of Japan*, vol. E62, No. 6, pp. 446-447, Jun. 1979.
Jullien et al., "A Hardware Realization of a NTT Convolver Using ROM Arrays", *Proc. IEEE Int. Conf. on Acoustics, Speech and Signal Processing*, (ICASSP '80), pp. 788-791, Apr. 1980.
Holmann et al., "Longer NTT's with 2 as a Root of Unity", ICASSP 83, Boston, pp. 159-162 (1983).
Agarwal et al., "Fast Convolution Using Fermat Number Transforms with Applications to Digital Filtering," *IEEE Transactions on Acoustics, Speech, and Signal Processing*, pp. 87-97 (Apr. 1974).

*Primary Examiner*—Gary V. Harkcom
*Assistant Examiner*—Dale M. Shaw
*Attorney, Agent, or Firm*—Larson and Taylor

[57] ABSTRACT

A multipler having two inputs and one output. Each input receives a binary input signal through a block which performs an arithmetic base change and encoding and a NTT circuit. The NTT is performed with a modulus M of the form $2^p - 2^q + 1$. The output is applied to a block for decoding and return to the original arithmetic base in series relation with a $NTT^{-1}$ circuit.

12 Claims, 6 Drawing Sheets

DEVICE FOR REAL TIME PROCESSING OF DIGITAL SIGNALS BY CONVOLUTION

FIELD OF THE INVENTION

The invention relates to devices for carrying out real time processing of a signal, requiring therefore a high computation speed, comprising the calculation of convolution products which may be reduced to cyclic convolutions of the form:

$$Y_n = \sum_{k=0}^{N-1} x_k \cdot h_{n-k}$$

where n=0, 1, ..., N−1, as well as n-k, are considered modulo N.

The invention is suitable for use in installations requiring digital signal processing and it is particularly important in digital filters, such as those used in modems forming interfaces between a digital system and a transmission channel.

PRIOR ART

Obtaining a high processing speed depends on reducing the complexity of the calculations to be calculated. A conventional solution used is computing the discrete Fourier transfor (DFT) on x(n) and h(n) and the products of the results, and then the inverse transform of the result. But this solution uses complex numbers and leads to rounding off errors. In addition, the number of multiplications and additions required for each point of the convolution, even when advanced algorithms are used (fast Fourier transform, Winograd algorithm), remains excessive for real time processing of high data flows.

A solution which seems more advantageous consists in using the number theoretic transform (NTT). Then the hardware for computing convolution products may be of the kind shown in FIG. 1. The relationship between the input and output of the NTT circuits is:

$$X_k = \sum_{n=0}^{N-1} x(n) \cdot a^{nk} (\text{mod } M) \quad (1)$$

with k=0, 1, ..., N−1.

In this formula, $\alpha$ is an Nth primitive root of the modulo M unity.

The NTT$^{-1}$ circuit performs the inverse transformation.

The advantages which can be expected of the NTT transforms are of two kinds. The convolution is obtained exactly, without calculating noise, provided that its value is less than M. If the length N-modulus M pair is correctly selected, $\alpha$ may be very simple, for example equal to 2. In this case, the transform no longer comprises general products but only multiplications by $2^k$ which are obtained by shifts in binary circuits. For longer transforms, $\alpha=\sqrt{2}$ may also be adopted. Hereagain, the multiplications are suppressed in the part which operates on transforms without appreciably increasing the number of additions. But, on the other hand, there are two drawbacks: the multiplications are replaced by handling at the bit level; the operations, in particular additions, must be performed modulo M. A detailed examination shows that such simplifications are of advantage only if used in transforms of small length, particularly for N=4 and N=3. But, in practice, it is necessary to have transforms of a very much greater total length and that requires using transforms which may be broken down into transforms of smaller length.

Taking these reasons into consideration, NTT arithmetics have been essentially adopted up to now using values of M resulting from sums or differences of two or three different powers of 2.

In the first case, where $M=2^n\pm 1$, two known transforms are used, namely Mersenne number transform (MNT) and Fermat number transform (FNT) for which the arithmetic is simple. An implementation of the FNT is described in "Fast Convolution Using Fermat Number Transforms with Applications to Digital Filtering", by Agarwahl et al, IEEE Transactions, Vol. ASSSP-22, No. 2, April 1974, pp. 87-97. But these transforms do not allow great convolution lenghts N.

In the second case, the arithmetics used at present are only of interest for values of M allowing 2 to be used as primitive root of the modulo M integer: then $M=2^{2q}-2^q+1$ or $M=2^{2q-1}-2^q+1$.

The first solution is preferred for it readily allows breakdown into transforms of smaller length which may be calculated using high speed algorithms.

These solutions, even combined with "reduced by 1" coding which substitutes $C(x)=x-1$ for x, for simplifying the shifts, remain insufficient. The level of complexity of the shift still remains equivalent to three additions in the case where $M=2^{2q}-2^q+1$.

OBJECT OF THE INVENTION

It is an object of the invention to provide a real time processing device using NTT transform, with a modulus M of the form $2^p-2^q+1$ with P and q being integers, typically with M having the particular form $2^{2q}-2^q+1$, which is of advantage for some operations. It is a more specific object to simplify the required operations, particularly the bit shifts.

To this end, there is provided a device for real time processing of digital signals by convolution comprising:
multiplier means having inputs and an output;
circuits for performing a NTT with a modulus M of the form $$2^p-2^q+1$$

each associated with one of said inputs;
a reverse transformation circuit for performing NTT$^{-1}$ associated with said output of said multiplier means.

Each of the NTT circuits is preceded by means for performing an arithmetic base change and encoding; the circuit for performing NTT$^{31\ 1}$ is followed by a circuit for decoding and return to the original arithmetic base. The circuits are arranged so that to a number X modulo M in the original (powers of 2) base there corresponds, the new base, a number $x_{p-1} \ldots x_{p-2} \ldots x_1 x_0$ such that $$X = \sum_{i=0}^{p-q-1} f_i x_i + \sum_{j=0}^{q-1} e_{j-q+p}(\text{modulo } M) \quad (2)$$

In the new arithmetic base, it may be possible to use any one of several sets of values $f_i$ and $e_j$ leading to the same arithmetic circuits, as long as they fulfil the following conditions:

$(f_o, M)=1$ (that is to say $f_o$ and M are mutually prime, $f_o$ being an integer between 1 and M−1), $2f_{p-q-1}=e_o+f_o \pmod{M}$ and $2e_{q-1}=-f_o \pmod{M}$ $2f_i = f_{i+1}$, $2e_i = e_{i+1}$ for the other values of index i.

Two cases, convenient because of their simplicity, consist in taking:

$$f_o = +1; \text{ then } f_j = 2^j \quad j = 0, \ldots, P - q - 1$$
$$e_j = 2^{P-q+j} - 2^j \quad j = 0, \ldots, q - 1 \text{ or}$$
$$f_o = -1; \text{ then } f_j = -2^j \quad j = 0, \ldots, P - q - 1$$
$$e_j = 2^{P-q+j} + 2^j \quad j = 0, \ldots, q - 1$$

A theoretical study shows that it is indeed an arithmetic base for the whole of the modulo M integers: any number $0 \leq X \leq M$ has a single binary representation in the new base, except for numbers of the type $2^q - 1$ which have exactly two representations, which has no importance for the circuits as long as the two representations can be decoded. In the case, important in practice, where $P = 2q$, $f_o = 1$, the whole of these numbers is formed by the multiples of $2^q$.

Encoding (as well as decoding) may be effected after base change or before base change. But, in the second case, encoding will cause $C(X) = X - f_o$ to correspond with X. It will be seen hereafter that with $f_o = -1$, encoding and base change may be implemented in a same circuit.

The invention will be better understood from the following description of particular embodiments, given by way of examples.

SHORT DESCRIPTION OF THE DRAWINGS

FIG. 1, already mentioned, is a general diagram of a device for computing convolution products using NTT circuits;

FIG. 2, similar to FIG. 1, shows a signal processing device operating with two input signals X and H, corresponding to modulo M numbers, expressed in the usual binary base (successive powers of 2) and an output signal Y and delivering the cyclic convolution of X and H;

Figure 1:
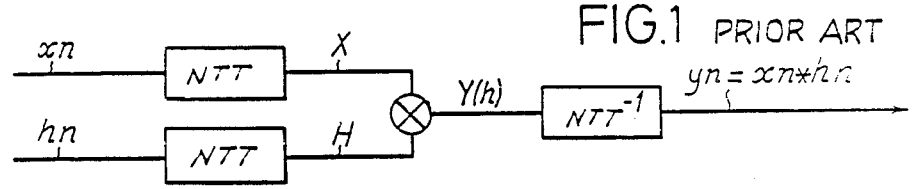
Figure 2:
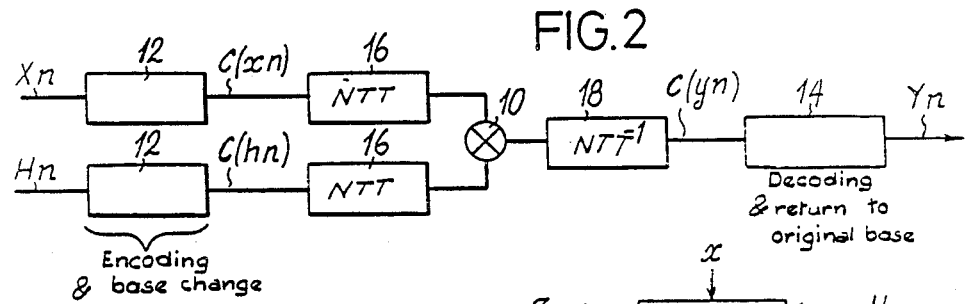
Figure 8:
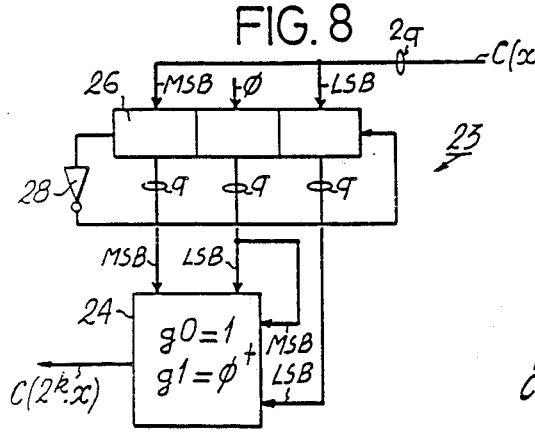
Figure 9:
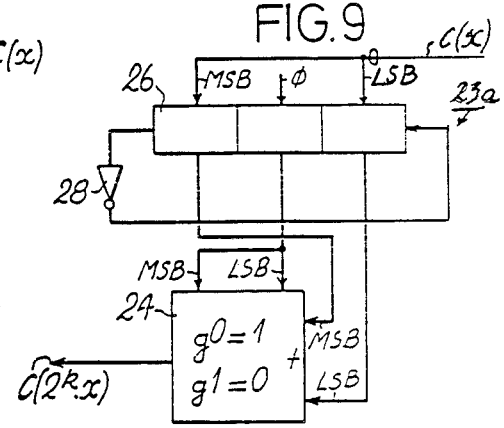
Figure 10:
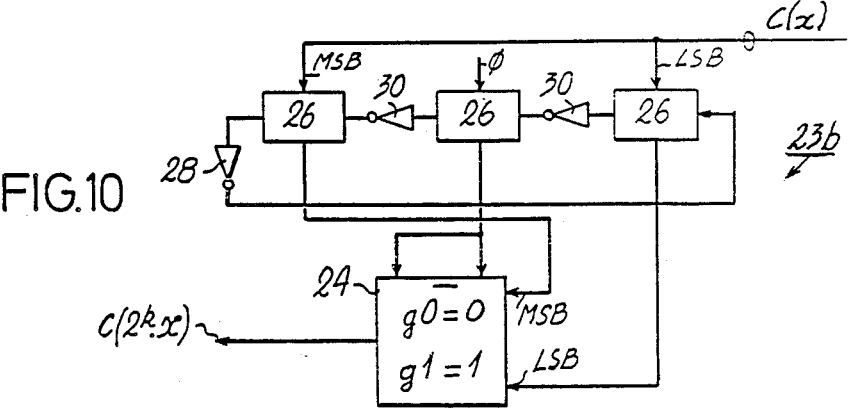
Figure 18:
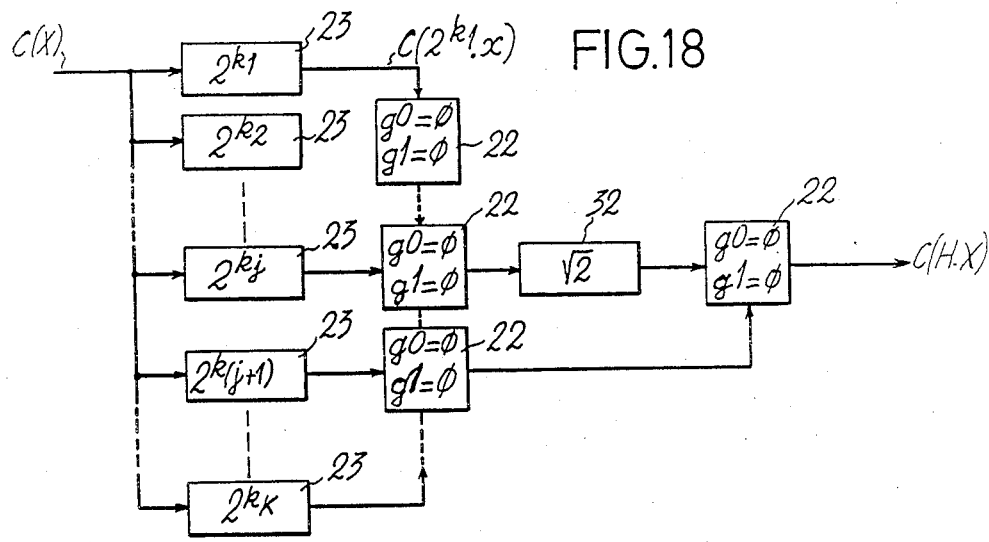
Figure 5:
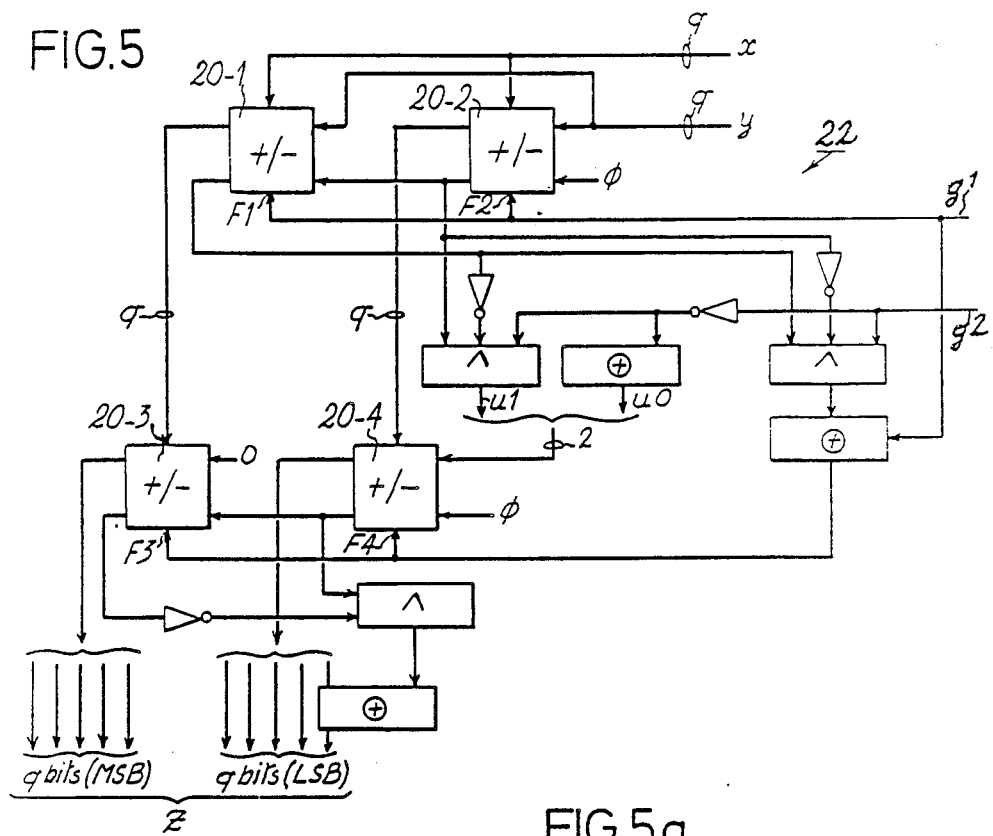
Figure 5A:
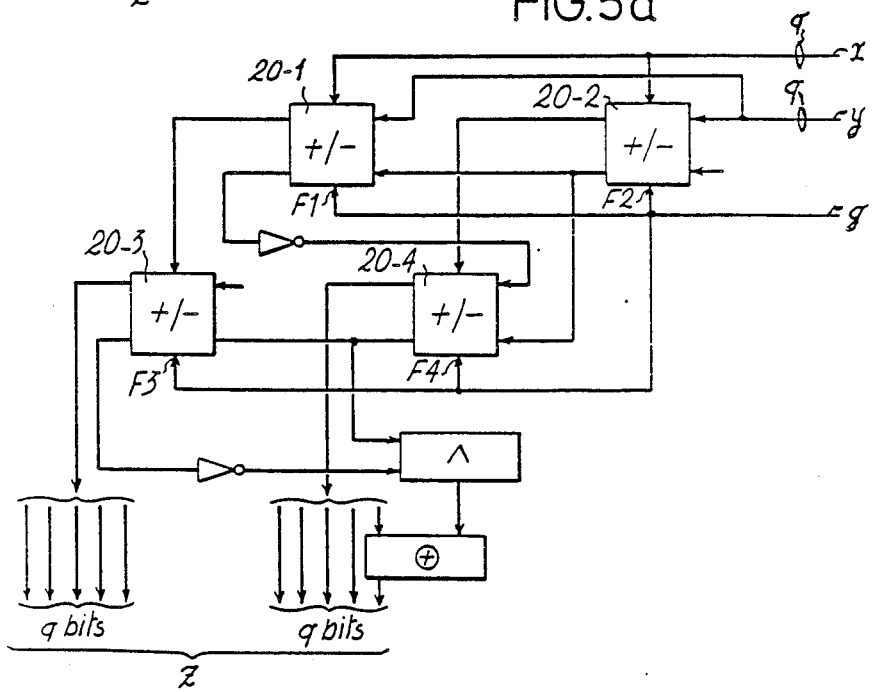
Figure 6:
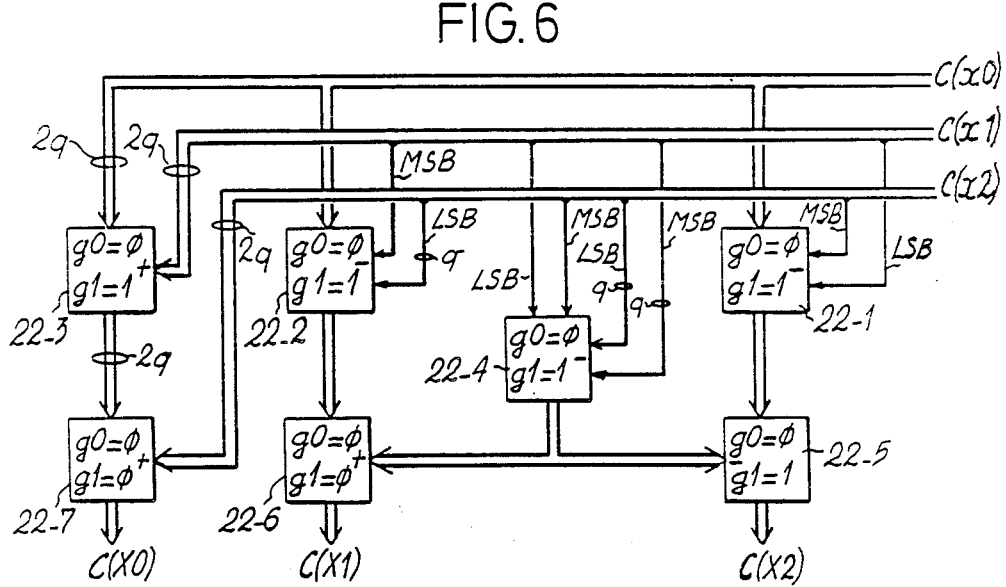
Figure 7:
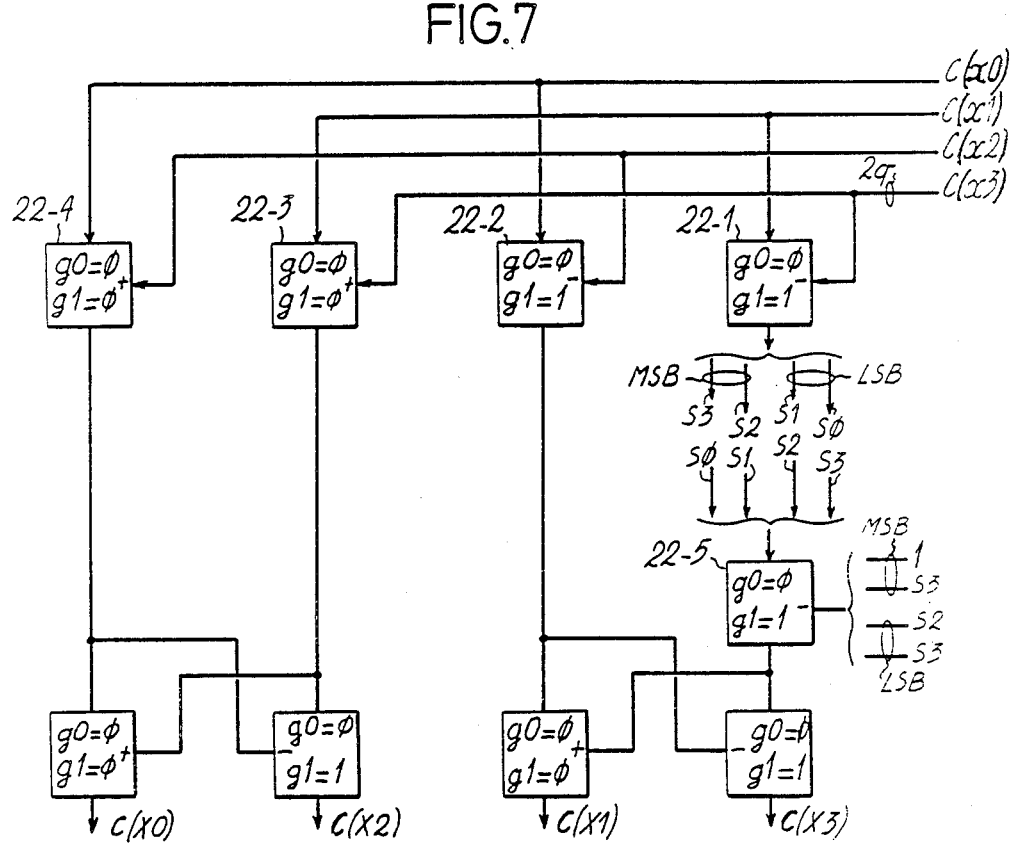
Figure 11:
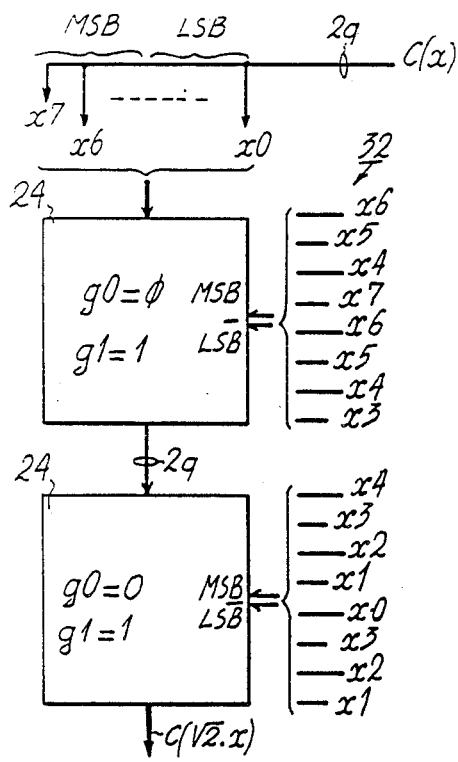
Figure 12:
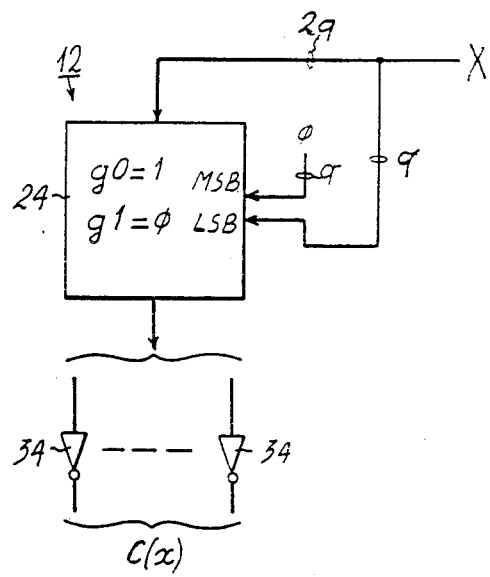
Figure 13:
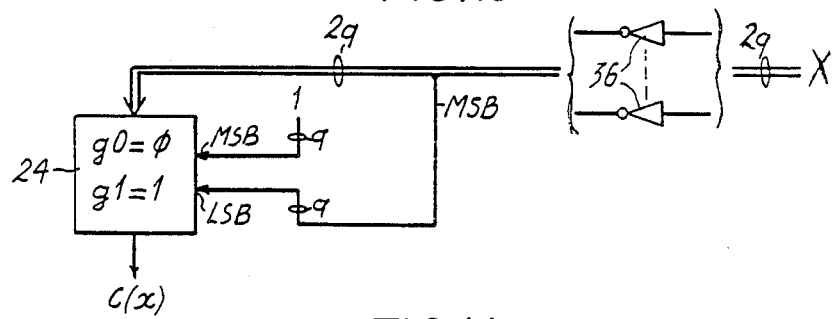
Figure 14:
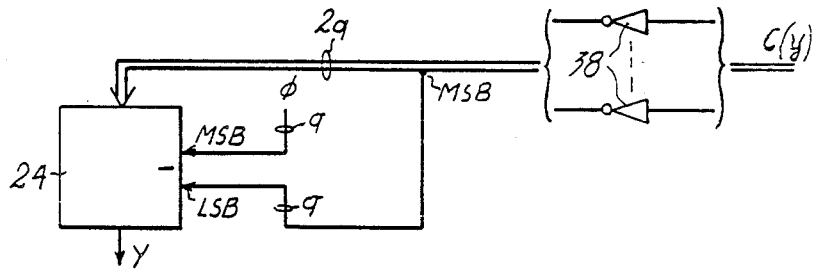
Figure 15:
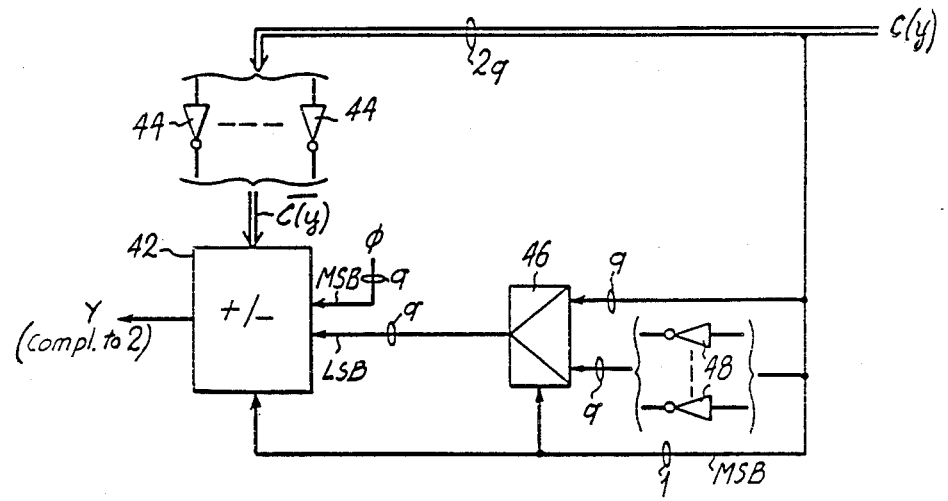
Figure 16:
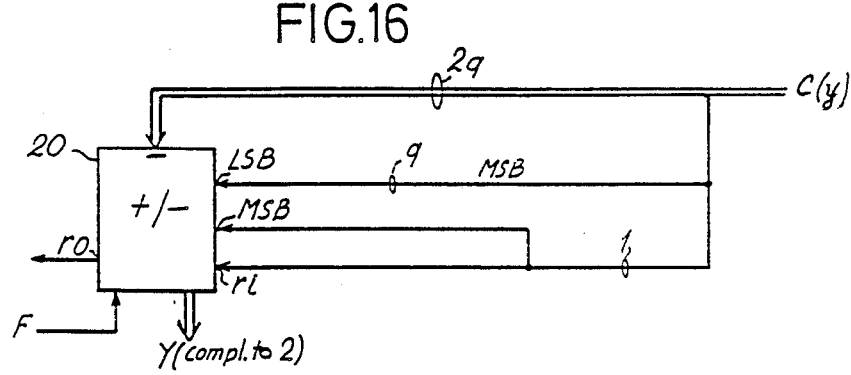
Figure 17:
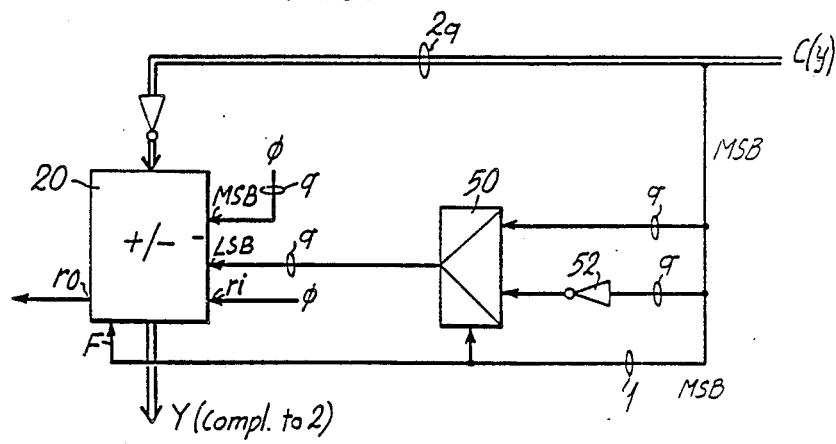

FIG. 5a, similar to FIG. 5, shows a simplified construction;

FIGS. 6 and 7 are block diagrams of NTT circuits of lengths 3 and 4, respectively;

FIG. 8 is a block diagram of a circuit for multiplying by $2^k$ "in the code" for use in circuits for recombining transforms of small length;

FIGS. 9 and 10 show modifications of FIG. 8;

FIG. 11 is a block diagram of a circuit for multiplication by $\sqrt{2}$ "in the code" for use in circuits for recombining short transforms;

FIGS. 12 and 13 are block diagrams showing two possible encoding and base change circuits causing C(x) to correspond with X;

FIG. 14, similar to FIGS. 12 and 13, is a general diagram of a circuit for decoding an return to the original base, causing Y to correspond with C(y);

FIG. 15, similar to FIG. 14, illustrates a circuit for decoding and return to the initial base, delivering Y as a "complement to 2" number;

FIGS. 16 and 17 are block diagrams of modifications of FIG. 15;

FIG. 18 is an overall block diagram of a general multiplication circuit suitable for use in the device of FIG. 2.

FIGS. 12 to 17 all correspond to the case $f_o = 1$, where the encoding (respectively decoding) operations and base change (respectively return to initial base) operations are carried out in a same circuit.

DESCRIPTION OF EMBODIMENTS

The block diagram of the device as a whole, then the functions to be fulfilled by the individual blocks, will be defined before specific circuits for implementing the invention are described.

Referring to FIG. 2, on each of the channels leading to the set of multipliers 10, the input data Xn or Hn (represented by a byte modulo M) is applied to a base change and encoding circuit 12 and is changed into a coded value C(nx) or C(hn). The two operations may be effected in any order. For Xn for example, it is possible:

either to carry out base change first and to transform the value X into x, then to encode for transforming x into $C(x) = x - f_o$, or to encode X into $C(X) = Xt_o$ and to carry out base change which gives C(x).

The circuit 14 for decoding and return to the initial base uses the possibility already mentioned consisting of combining the two operations in the case where $f_o = 1$.

Circuits 16 and 18 for computing the NTT and $NTT^{-1}$ transforms will associate a plurality of circuits providing transforms of short length, generally corresponding to $N = 3$ or 4, with circuits for assembling such transforms so as to provide the required length. The circuits supplying the transforms of short length will be preferably formed by selecting among a small number of types of operators so as to facilitate design and manufacture of the circuits.

There will now be described successively:

basic components used in the circuits;

a plurality of suitable constructions of adder-subtractor blocks incorporating the basic elements;

circuits for generating transforms of length 3 and length 4;

circuits for assembling such transforms so as to obtain transforms of greater length;

and, last, circuits which may be considered as "external" to the NTT, i.e. circuits for base change, encoding, decoding and general multiplication and are used for computing the convolution product.

The operators will be described as applied to transforms where $P = 2q$. But the results are in general also true for other pairs of values of P and q which do not comply with this condition.

Basic components

The types of basic components used for forming modulo M arithmethic adders-subtractors (FIGS. 4, 5 and 5a) are as small in number as possible. They each operate on q bits (or are formed by the association of elements each processing a number of bits which is a sub multiple of q).

The elementary or basic components comprise logic inverters, as well as conventional AND, OR and EXCLUSIVE OR (XOR) circuits. They further comprise elementary or basic adder-subtractor components 20. In the circuit shown in FIG. 4, they are adder-subtractors; in the circuits of FIGS. 5 and 5a, they are adder-subtractors operating on two's complement numbers. The notations which will be used appear on FIG. 3 in which:

x and y designate the numbers applied to the inputs of a circuit;

z designates the number appearing at the output;

ri is the ingoing carry over;

ro is the outgoing carry over;

F is a "flag" input, for selecting the working mode, for example for $F=0$, $z=x+y+ri+2^q.r0$ for $F=1$, $z=x-y-ri+2^2.r0$ The notations x and y used here are for describing the operation of an adder and a subtractor only. They are distinct from those which are used in the definition of the overall convolution processing.

The notations g0 and g1 will be used for designating the commands for obtaining the different types of required operations, in accordance with the following Table I:

TABLE I

| g1 | g0 | Type of operation | Calculation effected with C(x) and C(y) at the inputs | |
|---|---|---|---|---|
| 0 | 0 | additions in the code | $C(x + y) = x + y - f_o$ | |
| 0 | 1 | modulo M additions | $C(x) + C(y) = x + y - 2f_o$ | modulo M |
| 1 | 0 | code subtractions | $C(x - y) = x - y - f_o$ | |
| 1 | 1 | modulo M subtraction | $C(x) - C(y) = x - y$ | |

It can be seen that each operation results in delivering the code of the sum C(x+y) (or another combination) when two numbers x and y already coded as C(x) and C(y) are applied on inputs.

The additions and subtractions within the code are the only indispensable ones: the other operations are useful for shift only, where the modulo additions only provide a simplification.

Figure 4:
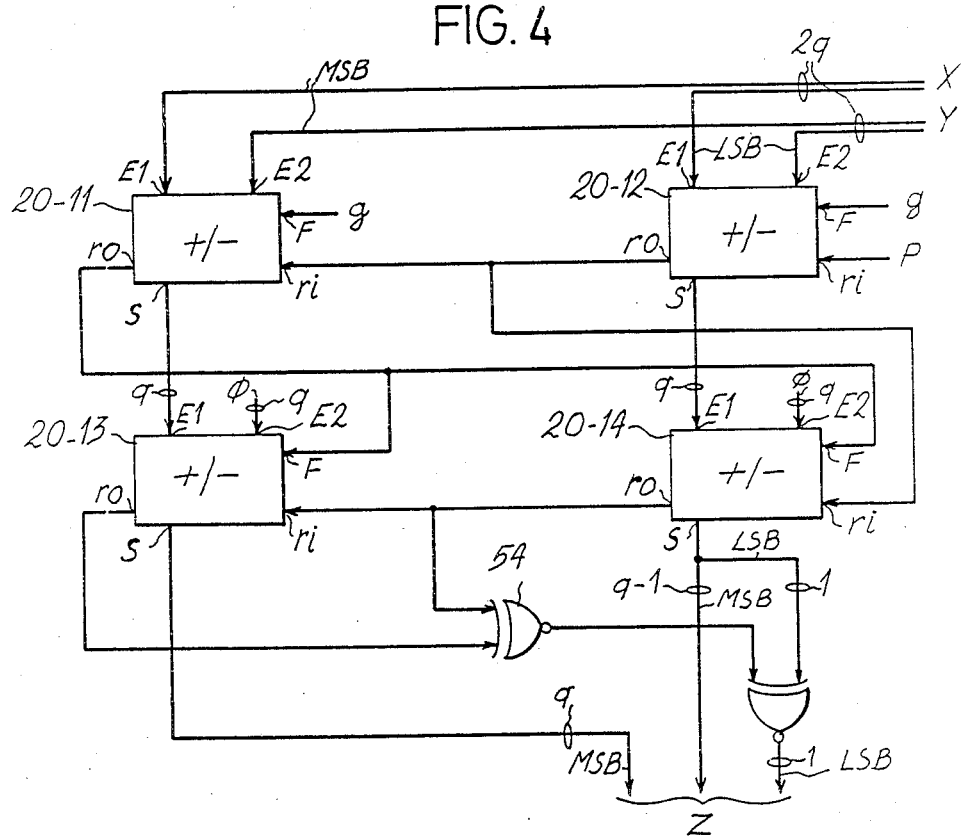
FIGS. 4 and 5 are block diagrams of general purpose adders-substractors, that of FIG. 5 associating several elementary adders-subtractors operating on "complement to 2" numbers.

Referring to FIG. 4, a first circuit will be described which carries out the four operations of Table I while embodying simple adders-subtractors only. A second circuit, shown in FIG. 5, effects these operations with two's complement numbers adders-subtractors. A simplified version which only effects the additions and subtractions within the code is illustrated in FIG. 5.

Adder-subtractor

FIG. 4 shows one possible construction of a "out of code" adder-substractor comprising four simple basic adders-subtractors 20-11, 20-12, 20-13 and 20-14. The adder-subtractor is arranged for processing numbers X and Y each having 2q bits and generating a number Z which has also 2q bits. Each basic adder-subtractor has two inputs E1 and E2 and a carry over input ri. It has a result output S and a carry over output r0.

With the circuit of FIG. 4, any of the following operations can be carried out on the data X and Y: code addition (addition within the code), modulo addition, code subtraction, modulo subtraction.

The operation to be carried out is selected by applying an appropriate level g to the flag input F and an appropriate binary (logic) level p to the carry over input ri of the basic adder-subtractor 20-12.

The q LSBs of X and of Y are respectively applied to the inputs E1 and E2 of the elementary (basic) adder-subtractor 20-12; the MSBs of X and of Y are respectively applied to the inputs E1 and E2 of the elementary (basic) adder-subtractor 20-12. The output ro of the adder-subtractor 20-12 is applied both to the input ri of the adder-subtractor 20-11 and to the input ri of the adder-subtractor 20-14. The carry over output r0 of the adder-subtractor 20-11 is applied to the flag inputs F of the adders-subtractors 20-13 and 20-14. The output S of the adder-subtractor 20-13 then supplies the q MSBs of Z; the output S of the adder-subtractor 20-14 gives q−1 of the LSBs of Z. Finally, the LSB of Z is supplied by an EXCLUSIVE NOR gate 54 whose inputs receive the r0 outputs of the adders-subtractors 20-13 and 20-14.

It should be noted that these two adders-subtractors effect operations which are carry over propagations. To the extent that the use of identical elementary blocks is not essentially desired, elements 20-13 and 20-14 may be appreciably simplified.

Thus the output Z is obtained given by the following Table II:

TABLE II

| | g | p | Z |
|---|---|---|---|
| Code addition | 0 | 1 | $X + Y + f_o$ |
| Modulo Addition | 0 | 0 | $X + Y$ |
| Code subtract. | 1 | 0 | $X - Y - f_o$ |
| Modulo subtract. | 1 | 1 | $X - Y$ |

The circuit of FIG. 5 allows the whole of the functions defined in Table I to be performed on input signals constituted by numbers of q bits with, for example, q=12, and also forms a general purpose adder-subtractor but, this time, using elementary adders-subtractors operating in "complement to 2" numeration. If required, the elementary addition-subtraction components 20 in "complement to 2" may be formed by placing three elements in series each operating on four bits in "complement to 2".

The circuit of FIG. 5 comprises four elementary addition-subtraction components 20-1, 20-2, 20-3 and 20-4 whose flag inputs are respectively designated F1, F2, F3 and F4. These adders are associated with circuits performing the functions AND (indicated ∧), OR (indicated ∨) and EXCLUSIVE OR (indicated ⊕). An examination of the circuit shows that F1=F2=g1 and that the value of flags F3 and F4 is:

$F3=F4=g1\oplus(\overline{r}q-1\wedge r2q-1\wedge g0)$

The outputs U1 and U0 then take the value:

$U1=\overline{g}0\wedge rq-1\wedge r2q-1$ $U0=rq-1\oplus\overline{g}0\oplus r2q-1$ Thus, as the output of the circuit, the value of z is obtained given by Table I for each pair of values of g0 and g1 and 2q bits, i.e. q LSBs and q MSBs.

It can be seen that by using the base defined by the Formula (2), only one circuit diagram need be used for computing four types of modulo M additions and subtractions required for calculating the transforms, defined by Table I.

The four adders-subtractors 20 are distributed into two layers. The second layer will be easier to form by monolithic integration than the first one, one of the signals applied to each of the elementary addition-subtraction components 23 and 24 of the second layer being a word of at most 2 bits.

Instead of the diagram shown in FIG. 5, the diagram of FIG. 5a may be used but only for performing additions-subtractions executed in the transformation code, which excludes the operations defined by the second and fourth lines of Table I.

For all the flags, the circuits of FIG. 5a only use a single value g, which may assume the two values of g1 in Table I. That single value is sufficient for fulfilling all functions corresponding to g=0 in that Table.

It will be seen that this simplified circuit is sufficient in many cases, despite its limitations.

It should be mentioned that the cascaded arrangement of an AND and an EXCLUSIVE OR is not at all essential for forming the LSB of z: any other arrangement providing the EXCLUSIVE OR function at the r0 output of 20-4, the complement of the r0 output of 20-3 and the LSB of the result output of 20-4 could be used.

In the Figures which will now be described and which show the circuits for generating the transforms of length 3 and 4 from blocks of the kind shown in FIG. 5 or 5a, the inputs g0 and g1 will not be shown for the sake of simplicity, the values given to g0 and g1 being alone indicated.

Circuit for elaborating NTTs of length 3 or 4 on coded words and after conversion in another base Referring to FIG. 6, a circuit provides the NTT of length 3 from three numbers previously encoded and converted into the new base, C(x0), C(x1) and C(x2). This circuit processes separately the q MSBs and the q LSBs. It is particularly simple since it does not comprise inversion of the input signals C(x0), C(x1) and C(x2). This result was reached by an appropriate selection of the operations performed by the different operators. The latter may all be in the form of circuits of the type shown either in FIG. 4, or in FIG. 5, or in FIG. 5a.

A transform of length 3 is thus obtained by using only seven modulo M adders distributed in two layers, which results in four layers of elementary components 20. Computing a FFT of the same length would have required two layers of three adders each operating on complex numbers and one layer of multipliers, slower and much more intricate.

FIG. 7 shows, similarly to FIG. 6, a circuit for providing the number theoretic transform of length 4. That circuit is again arranged for removing the need for input signal inversion. Hereagain, all elementary adder-subtractor components may be either the general purpose adders-subtractors of FIGS. 4 and 5, or the simplified version of FIG. 5a. For greater simplicity, the 2q bit connections and the q bit connections have not been illustrated differently in FIG. 7. Referring to FIG. 7, the 2q bits output of adder-subtractor 22-1 is separated into four parts each of q/2 bits. The two least significant outputs s0 and s1 are applied to the addition input of the adder-subtractor 22-5, in a different arrangement. The most significant outputs s2 and s3 are similarly applied to the addition input of the adder-subtractor 22-5 and to the subtraction input of the adder-subtractor 22-5. The fourth set of q/2 bits consists of 1s.

Circuits for assembling transforms of length 3 and 4 into transforms of greater length Procedures for asembling theoretic transforms of numbers are known. Such procedures are used in circuits for assembling FFTs. The operations required for assembling transforms essentially are multiplications by $2^k$ and by $\sqrt{2}$. But the procedure is appreciably simplified in the case of the invention, as will appear from the circuits which will now be described.

Certain module M and length M pairs using 2 as a root of unity are of particular interest. Those given in the article "Longer NTT's with 2 as a root of unity" by H. Hollmann et al, in ISCASSP, 1983, may be cited as examples.

Referring to FIG. 8, circuit 23 provides $C(2^k.x)$ starting from C(x). Physically, this operation is effected by elementary shifts each corresponding to a multiplication by 2. The corresponding circuit comprises an adder-subtractor 24 which may not have the simplified construction shown in FIG. 5a. The two inputs of adder 24 receive a combination of the least significant and most significant bits of C(x), introduced into a register 26 having a recirculation loop to inverter 28. The byte of 2q bits to be multiplied by $2^k$ is loaded in parallel into the two end portions applied on an input (not shown), k successive shifts are carried out in the register. The adder-subtractor 24 provides thee result of a modulo M addition.

The four half-words applied to the inputs of the adder-subtractor 24 may be combined in a way different from that of FIG. 8. FIG. 9 shows a circuit 23 which constitutes another embodiment and includes the same components 24, 26 and 28 as in FIG. 8.

Referring to FIG. 10, another embodiment may be implemented with simplified adder-subtractor of the type shown in FIG. 5. It requires however two additional inverters 30.

The shift registers 26 of FIGS. 8, 9 and 10 may be formed physically by multiplexers, controlled responsive to the value of k (number of shifts): thus a shift by k position takes place in response to one clock pulse, which results in time saving.

It will only be necessary to provide a multiplication by $\sqrt{2}$ circuit for certain values of N, which lead to using $\sqrt{2}$ as Nth root of unity. For example, for P=2q, N=6q, $$\sqrt[N]{1} = \sqrt{2} = 2^{N/8}(2^{N-4} - 1) \bmod M.$$

In this case, one addition step is saved as compared with the usual methods of multiplication by $\sqrt{2}$, due to the change of base. The multiplication may be performed by circuit 32 of FIG. 11 and uses two adders-subtractors 24 which may be of the simplified type described above.

The code words C(x) is split into eight portions x0, . . . x8 all having the same length. The portions are redistributed to the inputs of the "in code" subtractors 24. For easier reading of the block diagram of FIG. 11, the connections have not been shown; the words applied to the inputs are:

First subtractor:
  + input: x2 x1 x0 1 1 x7 x6 x5
  − input: x6 x5 x4 x7 x6 x5 x4 x3

Second subtractor:
  + input: output of the first adder
  − input: x4 x3 x2 x1 x0 x3 x2 x1

Circuits external to the NTT and NTT$^{-1}$

The processing device comprises, in addition to the transform computation circuits, circuits 12 and 14 (base change, encoding and decoding) and the general multiplication circuit 10.

By way of examples, circuits will now be described which are appropriate when the base change, as defined by Formula (2), is performed with f0=−1. The base change and encoding circuits may then be very simple, for the two operations only form a single one, consisting of conversion from the "complement to 2" of a binary number in the usual base of successive powers to 2, to the coded number represented in the new base.

FIGS. 12 and 13 show two circuits for base change and encoding in a case where all the signals processed are positive. This condition may be readily fulfilled by adding a constant value to the input signal.

Referring to FIG. 12, the circuit comprises an adder-subtractor 24 to which a command g0=1 is applied. That circuit cannot consequently be of the type shown in FIG. 5a. One of the inputs receives the value X to be coded as C(x). THe other input receives q zeros as MSBs and the q most significant figures of X as LSBs. The inverse of C(x) will appear on the output of the adder-subtractor 24 and C(x) may be recovered with inverters 34. This circuit therefore requires only one adder-subtractor, 2q inverters and means for redistributing the bits of X. The result is obtained by "out of code" addition of words and computing the complement of the result.

The modified embodiment shown in FIG. 13 includes an adder-subtractor 24 which may be of the simplified type shown in FIG. 5a. The input elements of that embodiment consists of a set of inverters 36 which provide the complement of X at their output. This complement is applied to one of the inputs of the adder-subtractor 24. The other input receives, as most significant bits, q "ones" and as least significant bits, the q most significant bits of the said complement. The result C(x) is then obtained directly at the output of adder 24.

Encoding and base change would be a complementation only if X were coded over less than q bits. But, because of the addition of a constant to the input signal for making X positive or zero, this condition will generally not be fulfilled.

In the case where it is assumed that X is given as complement to 2 over q bits, or less, encoding and base change form a single operation which is very simple: it is sufficient to extend X over 2q bits, by propagation of the sign bit in a register, then to complement the contents of the register thus obtained.

The circuits for going over from the number coded in the new base to a number coded as complement to 2 in the starting base (base of the powers of 2) may also be achieved in a simple way. This operation is effected by circuit 14 on the result C(y) of the inverse number theoretic transform NTT$^{-1}$ in FIG. 2.

In the case where Y is a positive binary number or zero, the circuit may be the one shown in FIG. 14. It comprises a set of inverters 38 for complementing the input signal C(y) and a conventional subtractor 40. The + input of the subtractor receives the complement of C(y). The − input receives q zeros as most significant bits, and the four most significant bits of the complement of C(y) as least significant bits.

To the extent that it is desired to have Y in the form of its complement to 2, the circuit may be the one of FIG. 15. It comprises an adder-subtractor 42 having a flag input F which allows two different operating modes depending on whether this input is at zero or at one. The + input of adder-subtractor 42 receives the complement to 2 of the signal C(y) elaborated by inverters 44. The other input receives q zeros as most significant bits, the output of a two to one multiplexer 46 as least significant bits. One of the inputs of the multiplexer receives the most significant bits of C(y), the other the complement of this number of q bits elaborated by inverters 48. The most significant bit of C(y), which represents the sign, is applied to the input F and to the control input of the multiplexer 46.

When this sign bit is a zero, it is the most significant bits of C(y) which are applied to the second input of adder-subtractor 42 and the operation performed consists in the addition of C(y) and of the q most significant bits of C(y), to which the least significant weights are assigned. The adder-subtractor is then in the addition mode.

If on the contrary the most significant bit of C(y) is equal to 1, the output of the multiplexer is formed by the complement of the most significant bits of C(y) and the adder-subtractor 42 functions in the subtraction mode. The output Y is then formed by the difference between C(y) and the q most significant bits of C(y), assigned to the least significant weight.

Further variants of the base change and decoding circuits are possible, using modulo M addition-subtraction in the code.

Figure 3:
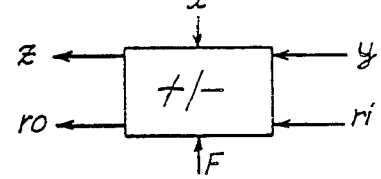
FIG. 3 is a diagram showing the notations used for designating the inputs and outputs of an elementary adder-subtractor used in different circuits of the device.

FIGS. 16 and 17 show two other circuits forming variants of the one shown in FIG. 15, also for obtaining Y as complement to 2 from C(y) and possibly using elementary adders-subtractors of the kind shown in FIG. 3 and which, depending on the state of flag F, supplies at its output:

For $F=0$, $x+y+ri$ for $F=1$, $x+\bar{y}+ri$

The operations are performed on numbers of 2q bits.

In the case of FIG. 16, C(y) is applied to the input which is subtractive for F=1 and the flag is set to 1. The sign bit of C(y) (most significant bit) is applied as carry over input ri. This same sign bit is applied as value of the four most significant bits to the additive input of the elementary adder-subtractor.

In the case of FIG. 17, it is the sign bit of C(y) which is applied to the flag input F.

The operation performed by the adder-subtractor 20 is an addition when flag F is zero, a subtraction when this flag is at one. If the bit sign of C(y) is equal to 0, at the output is obtained Y=C(y) with the q most significant bits of C(y) brought to the least significant weights of Y. The output of multiplexer 50 is in fact then the input formed by the q most significant bits of C(y).

If on the contrary the sign bit of C(y) is equal to one, Y is formed by C(y) from which are subtracted the q most significant bits of C(y) brought to the least significant weights. The output of the multiplexer is then in fact in this case the one which receives the q most significant bits via inverters 52.

Finally, circuit 10 of FIG. 2, which is required to perform a general multiplication, must be adapted so as to perform, term by term, N multiplications between:

the multiplicands formed by the N transformed words of the N incoming words Xn, the N multipliers formed by the N words transformed from the N incoming words Hn.

These multiplications may be performed by using the well known technique of successive additions and shifts.

But it is more advantageous to use the simple operators already defined for multiplying by any modulo M power of 2 (FIGS. 8, 9 and 10) and those for multiplying by modulo $M\sqrt{2}$ (FIG. 11). This result may be attained by a processing procedure which may be qualified as "method of generalized additions-shifts" and which will now be described.

When two numbers X and H are to be multiplied one by the other and when H is fixed, H is broken down into several terms:

$$H = \sum_{i=1}^{K} (\sqrt{2})^i \text{ Modulo } M$$

The terms of H may be arranged in the form:

$$H = \sum_{i=1}^{j} 2^{k_i}\sqrt{2} + \sum_{i=j+1}^{K} 2^{k_i}$$

The circuit may then be the one shown schematically in FIG. 18, where the top part corresponds to the first term of the above equation.

It should be noted that K may in this case be much smaller than in a representation in the form of a binary number to which a sign is assigned for a usual calculation.

The invention is susceptible of very numerous variants, concerning not only the construction of the components but also the association thereof.

In all cases, the elementary circuits present a great generality: the previously described modulo M adders-subtractors may be used whatever the chosen value of $f_o$. Thus a block is obtained which will alone be used in addition to current elements. Only the coding-base change and decoding-return to starting base circuits depend on the value chosen for $f_o$. Neither the adders-subtractors nor the shift elements depend on the total transform length. They depend solely on the modulus M chosen. The only element to be modified, depending on the total transform length, is the circuit for recombining the transforms of small length, which circuit is formed from circuits providing multiplication by 2 and by $\sqrt{2}$ in the case, which will be the most frequent, in which 2 or $\sqrt{2}$ is taken as the Nth root of the modulo M unity.

We claim:

1. A device for real time processing of digital signals by convolution, comprising:
    (a) multiplier means having a plurality of inputs and an output;
    (b) a plurality of circuits for performing a Numerical Theoretic Transform (NTT) with a modulus M of the form $$2^p - 2^q + 1,$$

where "P" and "q" are integers, each of said NTT circuits being connected to one of said multiplier inputs for delivering said NTT to the associated one of said inputs;
    (c) a reverse transformation circuit for performing an inverse Numerical Theoretic Transform ($NTT^{-1}$), said reverse transformation circuit connected to said output of said multiplier means for providing the $NTT^{-1}$ transform of said output;
    (d) a first unit consisting of (d1) means connected to each of said NTT circuits for performing an arithmetic base change and (d2) means for encoding, said first unit connected to receive an input digital signal and deliver an encoded signal to the respective one of said NTT circuit;
    (e) a second unit consisting of (e1) means for decoding and (e2) means for return to the original arithmetic base of the output of said circuit for performing $NTT^{-1}$, said means being so arranged that to a number X modulo M representing one of said input signals in the original (powers of 2) base, there corresponds, in the new base, a number $x_{p-1} \ldots x_{p-2} \ldots x_1 x_0$ such that $$X = \sum_{i=0}^{P-q-1} f_i x_i + \sum_{j=0}^{q-1} e_j \cdot x_{j-q+P} \text{ (modulo } M\text{)} \quad (2)$$

where $f_o$ is an integer of from 1 to N−1 and $f_i$ and $e_j$ are numbers that fulfill the following conditions:
$2f_{p-q-1} = e_o + f_o$ (mod M) and $2e_{q-1} = -f_o$ (mod M)
$2f_i = f_{i+1}$, $2e_i = e_{i+1}$ for the other values of index i
where "p", "q", and P are integers; and where "i" and "j" are integer indicies.

2. A device according to claim 1, wherein each of the NTT circuits is constructed to use a modulo M having the form $2^{2q} - 2^p + 1$ and to use 2 or the square root of 2 as Nth primitive root of unity modulo M.

3. A device according to claim 2, comprising a circuit for multiplication by the square root of two arranged for carrying out two modulo M additions within the code.

4. A device according to claim 2, comprising a circuit for multiplication by $2^k$ which consists of a shift register having an output connected to the input of a single adder in the modulo M code.

5. A device according to claim 1, wherein said base change and encoding means are embodied in a same circuit and $f_o = 1$ in the code change.

6. A device according to claim 1, wherein each of said NTT and $NTT^{-1}$ circuits, said means for decoding and said means for base change each consists of identical modulo M elementary adders-subtractors for performing at least a simple addition/substraction; and an addition plus an addition of $f_o$, within the code.

7. A device according to claim 6, wherein each adder-substractor out of the code consists of means for carrying out an addition and carry out.

8. A device according to claim 7, for handling numbers having 2q bits and for delivering a number consisting of 2q bits wherein each of said elementary adders-subtractors comprises: four simple adders-subtractors operating on two bits, each of said elementary adders-subtractors being connected to receive a different combination of MSBs and LSBs of input of said elementary adder-subtractor and
    two XNOR output circuits connected to receive two different combinations of outputs of said simple adders-subtractors.

9. A device according to claim 6, wherein each adder-subtractor within the code consists of means for carrying out an addition and carry over.

10. A device according to claim 1, wherein each NTT circuit has a long length N=3 and consists of seven modulo N adders distributed into a first and a second layer, said first layer having four adders which receive different combination of the Least Significant Bits (LSBs) and Most Significant Bits (MSBs) of the three numbers encoded and changed into the new base while said second layer has three adders which receive different combinations of the outputs of the adders of the first layer.

11. A device according to claim 1, wherein said multiplier means is arranged for performing N multiplications between
- N words C(x) which results from the transformation of N input words Xn and
- N multiplying factors consisting of N words resulting from the transformation of N input words $H_n$ where N is an integer; where C(x) is the coded value of "x"; and where $X_n$ and $H_n$ are the input words applied to said first unit inputs;
- and comprises means for multiplying the terms of a decomposition of $H_n$ in an arithmetic base of the successive powers of $\sqrt{2}$ with C(X), adding means for receiving and accumulating the outputs of the multiplying means, and a circuit for multiplying the output of the adder means with $\sqrt{2}$ where C(X) is the coded value of X.

12. A device according to claim 1, wherein the decoding and return to initial base circuit consists of an adder-subtractor circuit having positive and negative inputs and having a carry-over input, said adder-subtractor circuit connected to receive on the negative input thereof a transform C(y) from the output of said reverse transformation circuit, said transform having 2q bits,
- the MSB of said transform C(y), constituting the sign bit of said transform C(y) applied to said carry-over input,
- said sign bit also applied to the MSB of the positive input of said adder-subtractor circuit, and
- the LSBs of the transform C(y) applied on the LSBs of said positive input of said adder-subtractor circuit,
- whereby said adder-substractor delivers on its output the number after it has been decoded and brought back to the initial base as a complement to 2.

* * * * *